INVENTOR.
HILTON McBROOM,
FREDERRICK McBROOM
and RICHARD C. KLEIFGEN

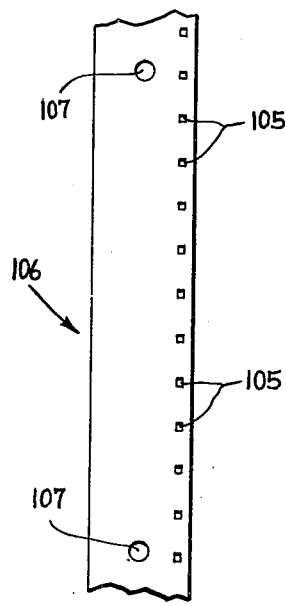
Fig. 3.
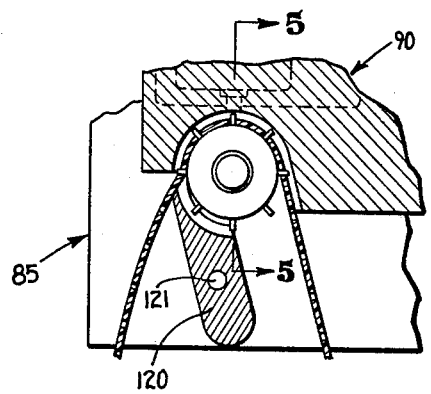
Fig. 4.
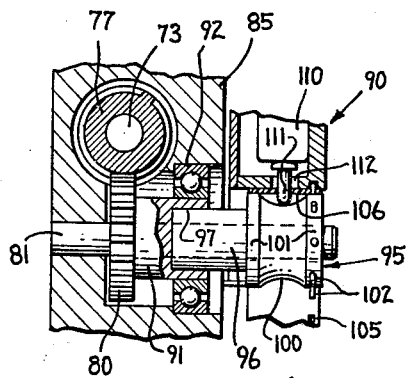
Fig. 5.
Fig. 6.
INVENTORS.
HILTON McBROOM, FREDERICK McBROOM
and RICHARD C. KLEIFGEN
BY
Woodard, Weikart, Emhardt & Naughton
Attorneys INVENTOR.
HILTON McBROOM,
FREDERRICK McBROOM
BY and RICHARD C. KLEIFGEN Woodard, Weikart, Emhardt & Naughton
Attorneys

United States Patent Office 3,497,147
Patented Feb. 24, 1970

3,497,147
SEQUENTIAL COIL WINDING MACHINE
Hilton McBroom, Frederrick McBroom, and Richard C. Kleifgen, Indianapolis, Ind., assignors to McBroom Electric Co., Inc., Indianapolis, Ind., a corporation of Indiana
Filed July 26, 1967, Ser. No. 656,148
Int. Cl. B65h 81/06
U.S. Cl. 242—7.09   7 Claims

ABSTRACT OF THE DISCLOSURE

A series of electrical wire coils are wound onto a multi-slotted winding form by guiding a wire over a helically threaded guide rod to the rotating winding form. The winding form is rotated by a first drive coupled to the form by a first electromagnetic clutch brake. The guide is periodically rotated by a second drive coupled thereto by a second electromagnetic clutch brake. In order to start the wire to forming another coil in an adjacent empty slot, the second electromagnetic clutch brake is operated to engage the clutch and release the brake so that the second drive rotates the rod causing the helical thread on the rod to direct the wire to a new slot. When the wire has been so redirected, the second clutch brake is operated to engage the brake and release the clutch stopping the rod. When a group of such coils has been wound, the first electromagnetic clutch brake operates to stop the rotation of the winding form. This starting and stopping is controlled by adjustable but positive power take-off means coupled to two programmed tape reading stations, one station controlling the first electromagnetic clutch brake and thus the winding form drive while the other station controls the second electromagnetic clutch brake and thus the rod drive.

BACKGROUND OF THE INVENTION

Field of the invention

This invention relates to coil winding apparatus.

Description of the prior art

Many types of coil winding apparatus have been devised and are known in the art. One such apparatus is shown in the U.S. patent to McBroom et al. 3,289,955 and is particularly useful in the medium or small sized shop for winding a plurality of coils in side-by-side relation as replacement coils for the armature or stator of a motor. The apparatus shown in the McBroom patent is an improvement in that it does avoid the overwinding that frequently occurs in manually actuated coil winding apparatus and accomplishes this desirable result with minimum expense. Even so as the shop owner's business increases and as he finds that he is winding more and more of the same type of coil windings, it is desirable that he be able to reduce labor costs by speeding up the operation of his McBroom coil winder and by making its operation more automatic.

SUMMARY OF THE INVENTION

The present invention provides such desirable results by automatic indexing of the wire so that it is not necessary for the operator to manually reposition the wire into the next slot in the winding form.

One embodiment of this invention might include coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, and means for rotating said rod about its axis to advance the wire longitudinally of the rod in said thread and to cause the wire to be wound in a different slot.

One object of this invention is to provide improved coil winding apparatus.

Another object of this invention is to provide coil winding apparatus including automatic indexing means which has very low inertia and which therefore can operate quickly with relatively low power requirement.

Still another object of this invention is to provide coil winding apparatus which makes possible easy conversion of manually operated coil winding apparatus.

Related objects and advantages will become apparent as the description proceeds.

BRIEF DESCRIPTION OF THE DRAWING

FIG. 3 is a plan view of a piece of photographic film or tape used with the present invention.

FIG. 4 is an enlarged vertical section taken along the line 4—4 of FIG. 1 in the direction of the arrows.

FIG. 5 is an enlarged vertical section taken along the line 5—5 of FIG. 4 in the direction of the arrows.

FIG. 6 is an enlarged vertical section taken along the line 6—6 of FIG. 1 in the direction of the arrows.

DESCRIPTION OF THE PREFERRED EMBODIMENTS

Figure 1:
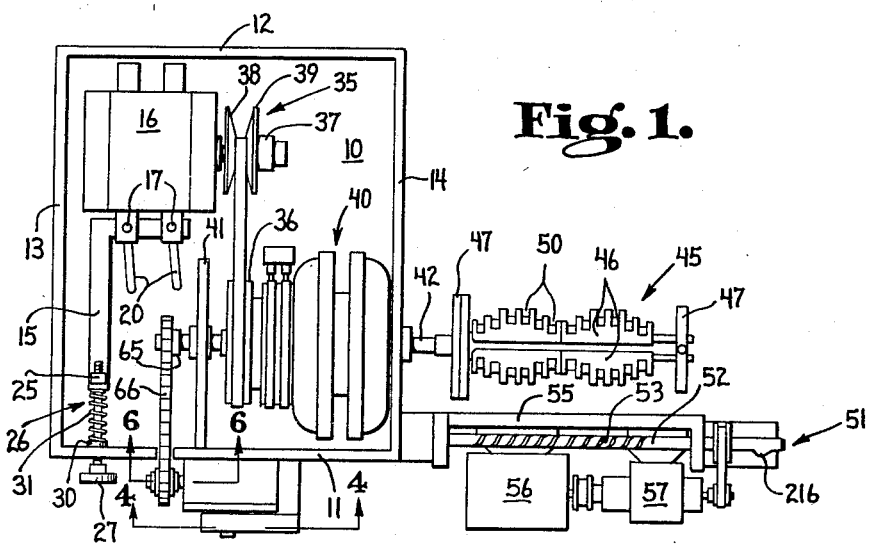
FIG. 1 is a top plan view of coil winding apparatus constructed according to the present invention.
Figure 2:
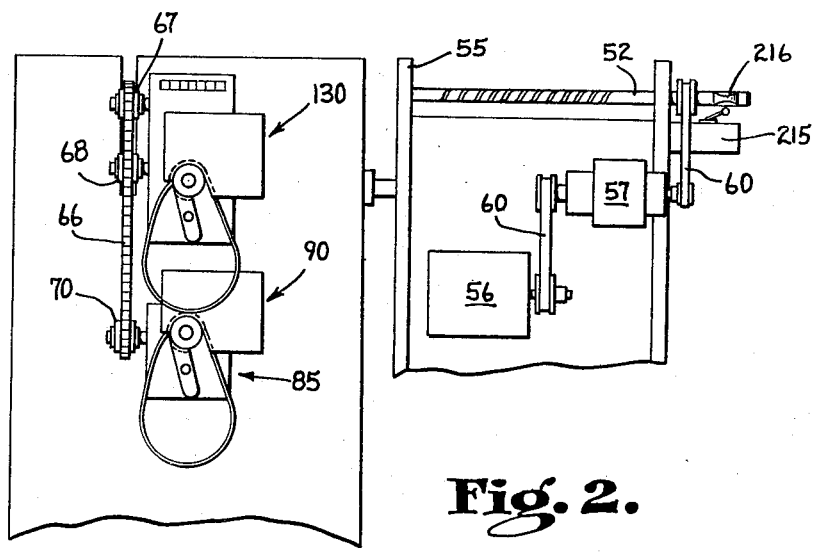
FIG. 2 is a front elevation of the structure of FIG. 1.

Referring now more particularly to the drawings, there is illustrated a coil winding apparatus which in large part is identical to the coil winding apparatus disclosed in the above mentioned McBroom patent. Thus, the coil winding apparatus illustrated includes a base 10, a front wall 11, a rear wall 12 and side walls 13 and 14. The base 10 has a motor 16 reciprocally mounted thereon. Secured to the motor 16 by a mounting frame 15 are mounting pins 17 which project downwardly into slots 20 which extend at an angle to the sides 13 and 14.

The mounting frame 15 has an upstanding lug 25 fixed thereto. Threadedly received within the lug 25 is a screw 26 having an enlarged head 27. Fixed to the screw by a setscrew and in spaced relation to the head 27 is a collar 30. It can be appreciated that even though the screw 26 is rotated by manual gripping of the head 27, the screw will retain the same axial position as limited by the head 27 and the collar 30.

A coil spring 31 is received upon the screw 26 and acts between the lug 25 and the collar 30. The spring 31 assists the operator in positioning the motor toward the side 12 of the frame. When the motor is moved toward the side 12, the pins 17 ride along the slots 20 so as to maintain the variable speed pulley 35 properly aligned with the pulley 36. The variable speed pulley 35 is conventional in nature and incorporates spring means within the portion 37, said spring means acting to resiliently hold the pulley half 39 toward the pulley half 38 which is fixed to the drive shaft of the motor 16. The variable speed pulley 35 may be, for example, model No. 51 manufactured by the Gerbing Manufacturing Company of Elgin, Ill.

An electromagnetic clutch brake 40 is mounted upon bearing plate 41 and the side plate 14 by a suitable shaft 42. The bearing plate 41 is fixed to the base and the front of the apparatus. The electromagnetic clutch brake 40 is conventional in nature and may be model No. 308/308 manufactured by Eaton Manufacturing Company of Kenosha, Wis. The electromagnetic clutch brake 40 is chosen for its relatively small inertia of those parts which start and stop upon energization of the clutch and energization of the brake, respectively.

Fixedly mounted upon the shaft 42 is a winding form 45. The winding form 45 is conventional in nature and might be, for example, model Holden Head, manufactured by H. A. Holden Company, Inc., of Minneapolis, Minn. The form 45 incorporates two elements 46 which are identical and are fixed in spaced parallel relationship by the members 47. The elements 46 have a plurality of grooves 50 which are formed with different radii. Each groove 50 in one of the elements 46 corresponds to and is aligned with another such groove in the other element 46. After winding has been completed upon the form 45, the two elements 46 can be moved together to permit removal of the coils from the form.

Fixed to the front of the apparatus is a wire guide and advance mechanism 51 which includes a rod or roll 52 having an external thread 53 therein. The rod 52 is rotatably mounted upon the frame 55. Also mounted upon the frame 55 is an electric motor 56 and an electromagnetic clutch brake 57 which, through suitable two-belt couplings, couples the electric motor 56 to the rod 52. In operating the present apparatus, the operator attaches the wire to be coiled to the winding form 45 within one of the grooves 50 toward, for example, the rightward end of the form. The foot pedal of the apparatus is then depressed causing rotation of the winding form 45. After the proper number of turns have been wound upon the winding form in the rightmost groove 50, the wire is automatically stepped to the next groove 50 by a single rotation of the rod 52. Thus, the wire being wound on the winding form 45 is payed out from a suitable spool and extends across the rod 52 in the thread 53, thence to the winding form 45. Because the wire is guided by the thread 53, rotation of the rod 52 by a single revolution moves the wire longitudinally of the rod 52 by a distance equal to the pitch of the thread 53. Of course, the pitch is selected as equal to the distance between the centers of adjacent grooves 50 in the winding form 45.

The shaft 42 extends completely through the electromagnetic clutch brake 40 and through the bearing plate 41 to a sprocket 65 which is fixed to the shaft 42 and has a chain 66 received thereon in meshing engagement therewith. The chain 66 drives further sprockets 67, 68 and 70. Both the sprockets 68 and 70 are adjustable and identical and are mounted identically. The sprockets 70 and associated structure is shown in FIGS. 6, 5 and 4 as representative of both these sprockets and associated structure. Thus, the sprocket 70 is mounted on an abutment element 72 fixed to a shaft 73 by a setscrew 75. The sprocket 70 is fixed in position by a nut 76. The shaft 73 is integral with a worm 77 which drives a worm wheel 80. The shaft 73 rotates within bearings 82 (one shown) mounted within a housing 85. The housing 85 is fixed to the front 11 of the apparatus and has mounted thereon a sensing head 90. The worm wheel 80 has a sleeve 91 integral therewith, said sleeve and worm wheel rotating about the shaft 81 and within bearings 92 mounted upon the head 85. There is also provide a film sprocket 95 having a sleeve 96 integral therewith and press fitted within the countersink 97 in the sleeve 91. The sprocket 95 has a concave central portion 100 which curves between two outward cylindrical portions 101 from one of which extend teeth 102.

The teeth 102 of the sprocket 95 project through and mesh with apertures 105 along one edge of a piece of film or tape 106. Spaced transversely of the film relative to the apertures 105 and located centrally of the film is a plurality of apertures 107 which are spaced longitudinally of the film at predetermined intervals depending upon the number of turns desired in each of the coils. In one embodiment of the invention, each of the apertures 105 is spaced apart a distance corresponding to one complete revolution of the winding form 45. Thus, the two apertures 107 in FIG. 3 are spaced longitudinally of the film at a proper interval to provide eleven turns in a coil.

Fixedly mounted within the sensing head 90 is a microswitch 110 having an actuating arm 111. The microswitch 110 may be a Micro model BZ-2RW882, manufactured by the Micro Switch Division of Minneapolis Honeywell Regulator Company, Freeport, Ill. The actuating arm 111 of the microswitch projects through an aperture 112 in the wall of the sensing head 90 and normally rides against the surface of the film 106. When an aperture 107 of the film moves into alignment with the arm 111, the arm is spring pressed into projected relation through the aperture causing actuation of the microswitch 110.

A film peeler 120 is pivotally mounted upon the housing 85 about a shaft 121 which is fixed to the housing 85. The film peeler rides along the sprocket as it rotates between the film and the sprocket, separating the film from the sprocket. The film peeler 120 normally engages the portion 101 of the sprocket.

All of the structure described above in connection with FIGS. 4, 5 and 6 is repeated in connection with the sprocket 68 and the sensing head 130. Thus, the function of the sensing head 90 is to index the wire from one coil to the next without stopping of the winding form while the function of the sensing head 130 is to stop the winding form after a certain predetermined number of coils have been wound in a plurality of the grooves 50. In the usual operation of the present apparatus, the operator may wind perhaps three coils without stopping of the winding form, those three coils forming, for example, a group of individual coils connected together as they will be connected in a motor. Such a group may form, for example, one magnetic pole of one phase of the motor. Between such groups of coils, there should be placed a twist of wire which can be formed manually by the operator before restarting the winding form.

It should be understood that the apparatus described above with the exception of the automatic indexing mechanism operates identically to the apparatus described in the above mentioned McBroom patent. Thus, the only modification made to the disclosure of the McBroom patent is the addition of the automatic indexing mechanism and the extra sensing head 90 for operation of the automatic indexing mechanism 51. In other respects, the construction and operation of the present apparatus is identical to the apparatus described in the McBroom patent. It should be pointed out that the adjustability of the sprockets 68 and 70 makes possible positioning of the form 45 relative to the sprockets so that indexing occurs from one groove to the next and so that winding stops when the flat side of the winding form 45 is facing upwardly.

Figure 7:
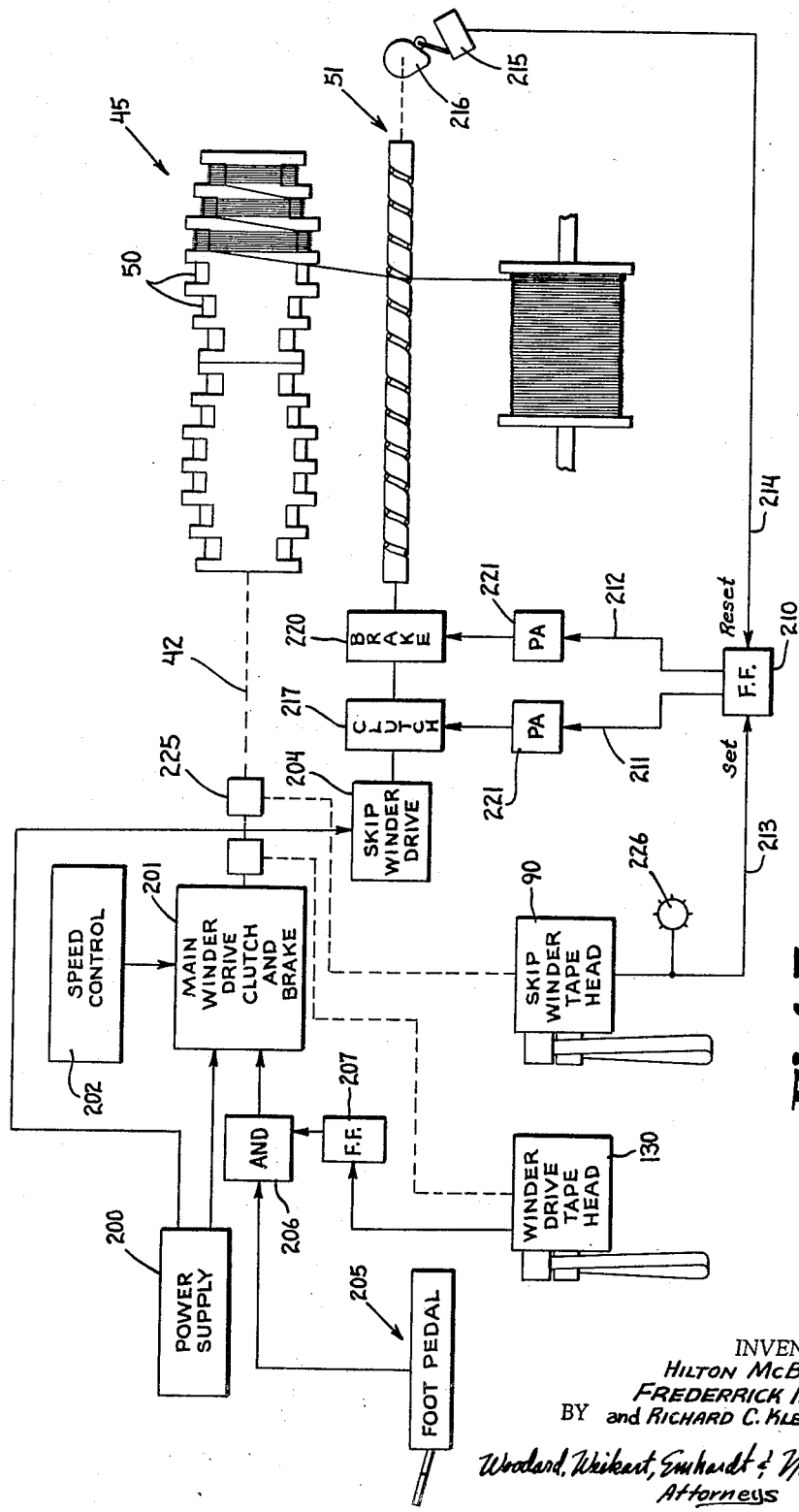
FIG. 7 is an electrical schematic block diagram of the present apparatus.

The control circuit of the coil winder of the present invention is shown diagrammatically in FIG. 7. A power supply 200, which may be a transformer connected to a standard voltage 60-cycle power source, provides electrical power to the main winder drive 201. The main winder drive 201 includes the electric motor 16 which may have a motor speed control 202 instead of or in addition to the control screw 26 and associated structure. The main winder drive 201 drives the shaft 42 and winding form 45 through the electromagnetic clutch brake 40 which also forms a part of the main winder drive 201. The power supply 200 also provides electrical power to the skip winder drive 204 which is the motor 56.

As explained above, the main winder drive is also positively coupled to and mechanically drives the respective sprockets 95 of the two punched paper tape sensing heads 90 and 130. The tape reader 130, which may be called the winder drive tape reader, controls the main winder drive 201 while the tape reader 90, which may be called the skip winder tape reader, controls the wire guide and advance mechanism 51. The coil winder is also provided with a foot switch 205 connected to the main winder drive through an "and" circuit 206, which may be formed of transistors, relays, or reed switches in many well-known forms. The output of the tape reader 130 is also connected to the "and" circuit 206 through a flip-flop circuit 207.

A flip-flop circuit 210, having two outputs 211 and 212, has a "set" input 213 connected to the output of the tape reader 90 and a "reset" input 214 connected to the output of a cam-operated switch 215. The cam-operated switch 215 is operated by a cam 216 on one end of the wire guide rod 52. One output 211 of the flip-flop circuit 210 is connected to the electric clutch 217 of the clutch brake 57 and the other output 212 is connected to the electric brake 220 of the clutch brake 57. Both the output 211 and the output 212 may include a power amplifier 221, which may be in the form of a reed switch, for increasing the amount of power delivered to the clutch 217 and brake 220.

In operation, after the speed of drive of the winding form is adjusted, the foot pedal switch is depressed. If the output of flip-flop circuit 207 is "on," the "and" circuit 206 will have an "on" output, which turns on the main winder drive 201. As the main winder drive turns, it drives the winder drive tape sprocket 95 of the sensing head 130, which advances its tape until a perforation in the tape triggers its output to shift the state of the flip-flop circuit 207, thus turning the output of the flip-flop circuit 207 "off." When this happens, the output of the "and" circuit 206 goes "off," stopping the main winder drive. The tape in the winder drive sensing head 130 is now indexed. Next, the skip winder attachment is turned "on." So that the skip winder sensing head may be easily indexed, the mechanical drive to it is provided with the adjustable coupling 225 which includes the adjustable sprocket 70 and above described associated structure. Adjustment of the coupling 225 is made to bring a perforation of the tape under the sensing head. An indicating lamp 226 may be connected to the output of the skip winder tape reader to facilitate this indexing procedure.

After the two tape readers have been indexed as outlined above, the wire to be wound into coils is affixed to the winding form 45 and the foot pedal 205 depressed. This starts the main winder drive, which rotates the winding form to wind the wire thereon and simultaneously drives the tape sprockets 68 and 70. The main winder drive 201 continues to run until either the foot pedal is released or until the tape in the winder drive tape head 130 triggers a change in the flip-flop circuit 207, turning "off" the output of the "and" circuit 206.

The number of turns in each coil of a coil group is controlled by the tape 106 in the skip winder tape head 90 which is driven by and positively coupled to the winding form 45. When the predetermined number of turns on the first coil has been reached, an aperture 107 in the tape triggers a change in the output of the skip winder sensing head 90, sending a signal to the input of the flip-flop circuit 210. The normal state of the flip-flop circuit 210 is with the output 212 "on," energizing the brake 220, and the output 211 "off," deenergizing the clutch 217. When the signal from the skip winder tape head 90 is applied to the input 213, the flip-flop circuit 210 changes state, energizing the clutch 217 and deenergizing the brake 220. This permits the skip winder drive 204 to rotate the wire guide roll 51, rapidly guiding the wire from the coil just completed with the proper number of turns to the next coil groove 50.

As the wire guide roll turns, it also turns the cam 216, which in turn operates the switch 215. Operation of the switch 215 sends a signal to the input 214 of the flip-flop circuit 210, resetting it to its normal state, thus energizing the brake 220 and deenergizing the clutch 217. The angular position of the cam 216 may be adjusted on the wire guide roll to compensate for the inertia of the wire guide roll so that the brake 220 will bring the wire guide roll to a stop at the proper position to feed wire to the next coil form. Similarly, when the predetermined number of turns of wire are wound on each coil form, the skip winder tape reader triggers the above described operation of the wire guide roll, guiding the wire onto the next coil form. When the predetermined number of total turns to be wound in the coil group, as indicated by the winder drive tape head 130, is reached, the flip-flop circuit 207 is shifted, and through the "and" circuit 206, turning off the main winder drive.

It should be mentioned that the entire skip over should be accomplished in less than one-half of a turn of the winding form which may be, for example, turning at 600 r.p.m. Thus, .05 second is provided for one-half revolution and skip over can be accomplished within this amount of time by the use of reed relays in the power amplifiers 221. These reed relays switch on and off in less than .002 second.

It will be evident from the above description that the present invention provides an improved coil winding apparatus. It will also be evident that the coil winding apparatus of the present invention incorporates automatic indexing means which has very low inertia and can operate quickly with relatively low power requirement. It will also be evident that the coil winding apparatus of this invention makes possible easy conversion of manually operated coil winding apparatus such as the coil winder of the above mentioned patent.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

We claim:

1. Coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, a rotary power source for rotating said rod about its axis to advance the wire longitudinally of the rod in said thread and to cause the wire to be wound in a different slot, an electromagnetic clutch brake coupling said rod and power source, means for measuring the rotary position of said winding form and for actuating said electromagnetic clutch brake to rotate said rod about its axis at a predetermined position of said winding form.

2. Coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, a rotary power source for rotating said rod about its axis to advance the wire longitudinally of the rod in said thread and to cause the wire to be wound in a different slot, an electromagnetic clutch brake coupling said rod and rotary power source, a sensing head including a rotatably mounted film tape sprocket coupled positively to said winding form for rotation therewith, a closed loop of tape received on said sprocket and having a first set of apertures at equally spaced intervals meshing with the teeth of said sprocket, a microswitch having an actuating arm positioned to bear against said tape as it moves with said sprocket, said tape having further apertures spaced transversely of said tape relative to said first set of apertures and located at predetermined spaced intervals along the length of said tape, an electrical power source for said motor and electromagnetic clutch brake, a circuit controlled by said microswitch and coupling said electromagnetic clutch brake to said electrical power source, said microswitch being arranged to actuate said circuit to engage said clutch and disengage said brake whenever said actuating arm drops into one of said further apertures, a cam mounted on said rod, and a second microswitch in said circuit and having an actuating arm positioned in the path of said cam, said second microswitch being arranged to actuate said circuit to engage said brake and disengage said clutch when said cam completes a portion of a revolution with said rod and engages said second microswitch to stop said rod at a desired position.

3. Coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, a rotary power source for rotating said rod about its axis to advance the wire longitudinally of the rod in said thread and to cause the wire to be wound in a different slot, an electromagnetic clutch brake coupling said rod and power source, means for measuring the rotary position of said winding form and for actuating said electromagnetic clutch brake to rotate said rod about its axis at a predetermined position of said winding form, a cam mounted on said rod, a microswitch having an actuating arm positioned in the path of said cam, said microswitch being arranged to actuate said electromagnetic clutch brake when said cam completes a portion of a revolution with said rod and engages the actuating arm of said microswitch to stop said rod after a single revolution thereof.

4. Coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, means for rotating said rod about its axis to advance the wire longitudinally of the rod in said thread and to cause the wire to be wound in a different slot, a first electromagnetic clutch brake coupling said motor to said winding form, a first sensing head including a first rotatably mounted film tape sprocket coupled positively to said winding form for rotation therewith, a first closed loop of tape received on said sprocket and having a first set of apertures at equally spaced intervals meshing with the teeth of said sprocket, a first microswitch having an actuating arm positioned to bear against said tape as it moves with said sprocket, said tape having further apertures spaced transversely of said tape relative to said first set of apertures and located at predetermined spaced intervals along the length of said tape, an electrical power source for said motor and electromagnetic clutch brake, a circuit controlled by said microswitch and coupling said electromagnetic clutch brake to said electrical power source, said microswitch being arranged to actuate said circuit to operate said brake and disengage said clutch whenever said actuating arm drops into one of said further apertures, manually operable means for actuating said circuit to close said clutch and disengage said brake, a second electromagnetic clutch brake coupling said rod and said rod rotating means a second sensing head including a second rotatably mounted film tape sprocket coupled positively to said winding form for rotation therewith, a second closed loop of tape received on said second sprocket and having a first set of apertures at equally spaced intervals meshing with the teeth of said sprocket, a second microswitch having an actuating arm positioned to bear against said second tape as it moves with said second sprocket, said second tape having additional apertures spaced transversely of said second tape relative to said first set of second tape apertures and located at predetermined spaced intervals along the length of said second tape, a further circuit controlled by said second microswitch and coupling said second electromagnetic clutch brake to said electrical power source, said second microswitch being arranged to actuate said further circuit to engage said clutch and disengage said brake whenever said second microswitch actuating arm drops into one of said additional apertures, a cam mounted on said rod and a third microswitch in said further circuit and having an actuating arm postioned in the path of said cam, said third microswitch being arranged to actuate said further circuit to engage said second brake and disengage said second clutch when said cam completes a portion of a revolution with said rod and engages said third microswitch to stop said rod at a desired position.

5. The coil winding apparatus of claim 4 wherein the positive coupling of said first film tape sprocket to said winding form is accomplished by a first clamping means, said first clamping means being readily releasable to uncouple said first tape sprocket and winding form to permit relative rotation thereof and recoupling thereof in their new relative position.

6. The coil winding apparatus of claim 5 wherein the positive coupling of said second film tape sprocket to said winding form is accomplished by a second clamping means, said second clamping means being readily releasable and reclampable to uncouple said second tape sprocket and winding form to permit relative rotation thereof and recoupling thereof in their new relative position.

7. Coil winding apparatus comprising a winding form, a motor arranged to rotate said winding form, said winding form having slots for receiving a wire adapted to be wound therein for forming the coils of a motor winding or the like, a wire guide and advance mechanism positioned adjacent said winding form for guiding wire into the various slots, said mechanism including a rod having an external thread therein, said wire extending across said rod and being guided by said thread to said winding form, means for rotating said rod about its axis to advance the wire longitudinally of the rod in said thread and to cause the wire to be wound in a different slot, and means for measuring the rotary position of said winding form and for actuating said means for rotating to rotate said rod about its axis at a predetermined position of said winding form.

References Cited
UNITED STATES PATENTS

| | | | |
|---|---|---|---|
| 2,726,820 | 12/1955 | Wilson | 242—9 |
| 3,011,728 | 12/1961 | Klinksiek | 242—9 |
| 3,128,956 | 4/1964 | Schumann | 242—9 |
| 3,166,104 | 1/1965 | Foley et al. | 140—92.2 |
| 3,237,657 | 3/1966 | Elvers et al. | 140—71.5 |
| 3,289,955 | 12/1966 | McBroom et al. | 242—9 |

BILLY S. TAYLOR, Primary Examiner

U.S. Cl. X.R.

140—92.2; 242—7.19